(12) United States Patent
Flores et al.

(10) Patent No.: US 12,516,140 B2
(45) Date of Patent: Jan. 6, 2026

(54) PROCESS FOR PRODUCING ETHYLENE HOMO- AND COPOLYMERS

(71) Applicant: INTERNATIONAL TECHNICAL EXCELLENCE CENTERS, INC., Baton Rouge, LA (US)

(72) Inventors: Joaquin Flores, Madrid (ES); Charles Beals, Baton Rouge, LA (US)

(73) Assignee: INTERNATIONAL TECHNICAL EXCELLENCE CENTERS, INC., Baton Rouge, LA (US)

( * ) Notice: Subject to any disclaimer, the term of this patent is extended or adjusted under 35 U.S.C. 154(b) by 566 days.

(21) Appl. No.: 17/928,213

(22) PCT Filed: Jun. 9, 2021

(86) PCT No.: PCT/EP2021/065387
§ 371 (c)(1),
(2) Date: Nov. 28, 2022

(87) PCT Pub. No.: WO2021/250054
PCT Pub. Date: Dec. 16, 2021

(65) Prior Publication Data
US 2023/0212337 A1    Jul. 6, 2023

Related U.S. Application Data

(60) Provisional application No. 63/037,505, filed on Jun. 10, 2020.

(30) Foreign Application Priority Data

Jul. 22, 2020   (EP) .................................... 20187195

(51) Int. Cl.
*C08F 210/02*    (2006.01)

(52) U.S. Cl.
CPC ................................ *C08F 210/02* (2013.01)

(58) Field of Classification Search
CPC ............... C08F 210/02; C08F 2400/04; B01J 2219/00763; B01J 3/042; Y02P 30/40
See application file for complete search history.

(56) References Cited

U.S. PATENT DOCUMENTS 4,175,169 A    11/1979    Beals et al.

FOREIGN PATENT DOCUMENTS

| CN | 106496391 A | * | 3/2017 | ............... C08F 2/01 |
| CN | 106749815 A | * | 5/2017 | ........... C08F 210/02 |
| EP | 2439234 A1 | * | 4/2012 | ............... H01B 3/44 |
| EP | 2636691 A1 | * | 9/2013 | ......... B01J 19/2415 |
| EP | 3168237 A1 | | 5/2017 | |
| EP | 3168239 A1 | | 5/2017 | |
| WO | WO2013178241 A1 | | 12/2013 | |

OTHER PUBLICATIONS

International Search Report and Written Opinion mailed Sep. 9, 2021 for International Application No. PCT/EP2021/065387, 12 pages.
D3594-93 (Reapproved 2013) Standard Test Method for Copolymerized Ethyl Acrylate in Ethylene-Ethyl Acrylate Copolymers; ASTM International. Apr. 2013.
D5594-18a Standard Test Method for Determination of the Vinyl Acetate Content of Ethylene-Vinyl Acetate (EVA) Copolymers; by Fourier Transform Infrared Spectroscopy (FT-IR)1; ASTM International. Nov. 2018.
D6474-20 Standard Test Method for Determining Molecular Weight Distribution and Molecular Weight Averages of Polyolefins by High Temperature Gel Permeation Chromatography; ASTM International. Apr. 2020.

* cited by examiner

*Primary Examiner* — Kumar R Bhushan
(74) *Attorney, Agent, or Firm* — Squire Patton Boggs (US) LLP

(57) ABSTRACT

It is provided a process for producing an ethylene copolymer comprising compressing ethylene monomer at a certain pressure; adding a fresh comonomer in liquid form and, optionally, a fresh modifier in liquid form at a certain pressure to the compressed ethylene monomer; introducing the resulting compressed mixture into an autoclave reactor having a first reaction zone and at least one more reaction zone, the first reaction zone having a volume that is greater than 50% of the total reactor volume, and, optionally, at least one additional reactor; adding at least one free radical initiator in order to start a polymerization reaction; and separating the ethylene copolymer from the reaction mixture; wherein all the compressed ethylene monomer or the compressed mixture are introduced into the first reaction zone of the autoclave reactor, and wherein the compressed mixture is introduced into the autoclave reactor and, optionally, into the at least one additional reactor at a temperature from −20° C. to 70° C.

20 Claims, 3 Drawing Sheets

PROCESS FOR PRODUCING ETHYLENE HOMO- AND COPOLYMERS

CROSS-REFERENCE

This application is a National Stage filing under 35 U.S.C. § 371 of International Patent Application No. PCT/EP2021/065387, filed Jun. 9, 2021, which claims the benefit of and priority to U.S. Provisional Patent Application No. 63/037,505 filed on Jun. 10, 2020, and European Patent Application No. EP20187195.1 filed on Jul. 22, 2020, the contents of all of which are hereby incorporated by reference in their entireties for all purposes.

TECHNICAL FIELD

This present invention relates to the field of polymer chemistry. In particular it relates to a process for the manufacturing of ethylene homopolymer and copolymers at high pressure using a specific reactor configuration and high-pressure liquid injection of comonomers and modifiers at specific conditions.

BACKGROUND ART

High-pressure reactor polymerization plants convert relatively low-cost ethylene, optionally in combination with one or more comonomers, such vinyl acetate, into valuable polyolefin products. The polymerization takes place at relatively high temperatures and pressures and is highly exothermic. The resulting polymer is low-density polyethylene (LDPE), optionally containing comonomers. Produced products are used in multiple film and extrusion coating or moulding applications.

It is generally known to control the comonomer content and the polymer molecular weight by adding co-monomer and modifier in the suction of the secondary compressor and feed the resultant components to the reactor. However, adding a comonomer and modifier to the suction of the secondary compressor increases fouling, reduces reliability and increases the risk for process safety incidents. This is especially important on high comonomer content ethylene-vinyl acetate copolymers, or ethylene acrylate copolymers or ethylene acid copolymers, which also lead to corrosion due to acidity.

When producing LDPE, it is known in the industry that packings life of secondary compressors can operate 24,000 hours in first stage cylinders and 16,000 hours in second stage cylinders when best operating practices and original equipment manufacturer (OEM) recommendations are followed. However, it is also known that when producing ethylene copolymers, if comonomers or reactive modifiers are added to the suction of the secondary compressor, cylinder packing lifetimes reduced to values as low as 8,000 hours for the first stage and 5,000 hours for the second stage. Other compressor components like valves and plungers are negatively affected as well. This is due to several factors related with the type and concentration of comonomers, and modifiers used, which may polymerize at the compressor temperatures, among other related problems affecting the reliability of the compressor.

It is generally known as well the use of autoclave reactor configurations for the production of ethylene homo or copolymers. Autoclave reactor configurations typically consists of a stirred vessel with one or more reaction zones. The ethylene mixture from the secondary compressor, typically including comonomer (when required) and modifier, is cooled down through one or more reactor coolers and feed to each or most of the reaction zones of the autoclave reactor. The addition of the initiator to each reactor zone controls the reaction temperature. Production out of the reactor is mainly the consequence of the ethylene mixture flow feed into the reactor, reactor outlet temperature, individual reactor zone feed flow and temperature, and composition of feed components. However, it is generally known as well that the split flow distribution and reactor temperature, in addition to reactor pressure and mixture components concentrations, constitute the reactor production recipe to achieve the desired polymer properties.

Autoclave reactors utilize internal agitator driven by an electrical motor to enhance mixing. In most cases, the electrical motor is encapsulated within a chamber located in the upper part of the reactor vessel, utilizing part of the secondary compressor gas to cool the temperature at the motor chamber. The presence of a certain type of comonomers, especially of those exhibiting higher reactivity than ethylene like acrylates or acid copolymers, has as well a negative impact to the autoclave motor reliability and lifetime due to thermal polymerization. The same impact is occurring with the top autoclave bearing supporting the rotating agitator. The type of comonomer and its concentration is an essential factor. It is not uncommon to observe a typical motor life as high as 20,000-25,000 hrs lifetime when producing homopolymer, which is reduced to approximately 8,000-10,000 hrs when producing ethylene copolymers, and typical top packing life from as high as 15,000-20,000 hrs with homopolymer to less than 8,000 hrs with copolymers. This reduction in lifetime results in a higher risk for reaction decompositions in the top zone, increased downtime, and high maintenance costs.

There is, therefore, a need for an enhanced process for producing polyethylene copolymers that results in a higher reliability and lifetime of autoclave electrical motors and top autoclave bearings, while providing higher conversions and/or polymers having narrower molecular weight distributions.

SUMMARY OF INVENTION

Inventors have developed a new configuration of autoclave reactor, reaction conditions, flow split distribution of the ethylene mixture, and reactor inlet temperatures, that when operating at a pressure equal to or greater than 120 MPa, results in the production of a broad range of products, but also the increase of the output for a similar set of pressure and temperatures.

Particularly, the inventors have found that, when carrying out an ethylene polymerization reaction in an autoclave reactor having more than one reaction zones, by introducing all of the compressed ethylene monomer, optionally with a comonomer and/or a modifier, at a pressure from 120 MPa to 360 MPa in the first reaction zone of the autoclave reactor, under certain conditions and, particularly, at a relatively low temperature, higher conversions, higher productions and/or a range of ethylene and ethylene-based polymers having narrower molecular weight distributions than with processes of the prior art are obtained.

Thus, an aspect of the present disclosure relates to a process for producing an ethylene copolymer comprising:
 a. compressing ethylene monomer in one or more compressors to a pressure equal to or greater than 120 MPa, such as from 120 MPa to 360 MPa, in order to obtain a compressed ethylene monomer;

b. adding to the compressed ethylene monomer a fresh comonomer in liquid form at a pressure equal to or greater than 120 MPa, such as from 120 MPa to 360 MPa, in order to obtain a compressed ethylene/comonomer mixture;

c. optionally, adding into the compressed ethylene/comonomer mixture a fresh modifier in liquid form at a pressure equal to or greater than 120 MPa, such as from 120 MPa to 360 MPa, in order to obtain a compressed reaction mixture;

d. introducing the compressed ethylene/comonomer mixture, or the compressed reaction mixture into an autoclave reactor and, optionally, at least one additional reactor;

e. adding into the autoclave reactor and, optionally, into the at least one additional reactor at least one free radical initiator in order to start a polymerization reaction; and f. separating the ethylene polymer;

wherein the autoclave reactor has a first reaction zone and at least one more reaction zone, and all the compressed ethylene/comonomer mixture, or all the compressed reaction mixture that is introduced in the autoclave reactor is introduced into the first reaction zone;

wherein the autoclave reactor has a total reactor volume, and the first reaction zone has a volume that is greater than 50% of the total reactor volume; and wherein the compressed ethylene/comonomer or the compressed reaction mixture is introduced into the autoclave reactor and, optionally, into the at least one additional reactor at a temperature from −20° C. to 70° C.

Advantageously, the process of the present disclosure prevents process safety and reliability incidents, allows the operation with wider range of operating temperatures, reduces maintenance costs, expands the product range, and improves the efficiency (capacity) of the high-pressure process.

DETAILED DESCRIPTION OF THE INVENTION

Figure 1:
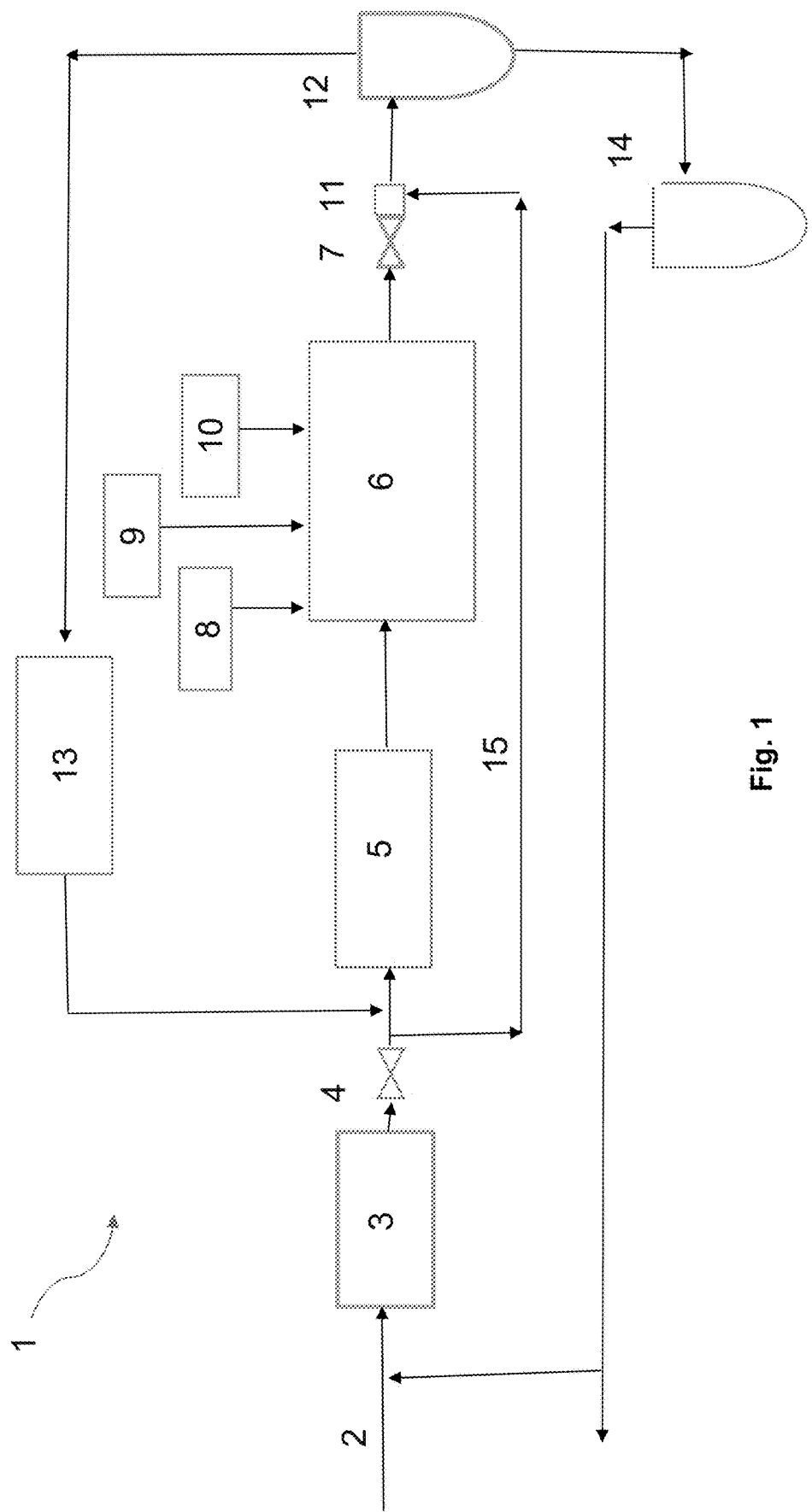
FIG. 1 shows schematically an ethylene polymerization plant.

All terms as used herein in this application, unless otherwise stated, shall be understood in their ordinary meaning as known in the art. Other more specific definitions terms as used in the present application are as set forth below and are intended to apply uniformly throughout the specification and claims unless an otherwise expressly set out definition provides a broader definition.

The term "comonomer", as used herein, refers to a compound present in the reaction mixture in a controlled quantity and that reacts with ethylene monomer in a copolymerization reaction.

The term "fresh" concerning to the comonomer or the modifier", as used herein, refers to the compound, i.e. the comonomer or the modifier, added from a source outside of the polymerization flow back to the reactor, i.e. not provide internally from a recycled source.

The term "recycle stream", as used herein, refers to recycled component(s) that are separated from the polymer after exiting a reactor, and are fed, after re-pressurization, to one or more reaction zones, at the inlet to each reaction zone.

The term "polymer", as used herein, refers to a compound prepared by polymerizing monomers, whether of the same or a different type. The generic term polymer thus embraces the term homopolymer (employed to refer to polymers prepared from only one type of monomer), and the term copolymer as defined hereinafter. Trace amounts of impurities can be incorporated into and/or within the polymer structure.

The term "copolymer", as used herein, refers to polymers prepared by the polymerization of ethylene and one or more comonomers.

The term "ethylene-based polymers", as used herein, refers to polymers comprising a majority amount of polymerized ethylene (based on the weight of the polymer), particularly more than 50 wt % ethylene monomer and one or more comonomers.

The term "reactor configuration," as used herein, refers to the devices used to polymerize monomers in order to obtain a polymer or copolymer.

The term "downstream", as used herein, refers to a point in a polymerization process (for example, an apparatus or stream) that comes after a point of reference (for example, a reactor).

The term "upstream", as used herein, refers to a point in a polymerization process (for example, an apparatus or stream) that comes before a point of reference.

The term "process stream", as used herein, refers to composition comprising one or more reactants coming into a reactor, or a composition comprising polymer coming from a reactor.

The term "compressed ethylene monomer", as used herein, refers to ethylene compressed by secondary compressor to a pressure equal to or greater than 120 MPa, where ethylene is the majority component, and may include other components included in the "recycle stream"

The term "compressed ethylene/comonomer mixture", as used herein, refers to the resultant mixture of mixing the "compressed ethylene monomer" stream with "fresh comonomer" added in liquid form at a pressure greater than 120 MPa.

The term "compressed reaction mixture", as used herein, refers to the resultant mixture of the "compressed ethylene/comonomer mixture" stream with "fresh modifier" added in liquid form at a pressure greater than 120 MPa.

The term "modifier", as used herein, refers to a compound present in the reaction mixture at a controlled quantity to the process to control the molecular weight and melt flow index of a produced polymer.

The term "chain transfer agent" is interchangeable with the term "modifier" as used herein. Chain transfer involves the termination of growing polymer chains, thus limiting the ultimate molecular weight of the polymer material.

The term "initiator", as used herein, refers to a compound added to the process to initiate the free radical polymerization process.

The term "molecular weight distribution", as used herein, refers to the distribution between the number of molecules of each polymer species ($N_i$) and the molecular weight of that species (Mi).

The term Mw/Mn (also known as polydispersity index) refers to the ratio of weight average molecular weight ($M_w$) to number average molecular weight ($M_n$), i.e. ($M_w/M_n$). $M_n$ and $M_w$ are determined as follow:

$$M_w = \frac{\sum M_i^2 N_i}{\sum M_i N_i} \quad M_n = \frac{\sum M_i N_i}{\sum N_i}$$

wherein, $N_i$ is the number of molecules having molecular weight $M_i$ in a given polymer sample.

It is noted that, as used in this specification and the appended claims, the singular forms "a", "an", and "the" include plural referents unless the context clearly dictates otherwise. Thus, the indefinite articles "a" and "an" are synonymous with "at least one" or "one or more."

As mentioned above, the present disclosure relates to a process for producing an ethylene polymer comprising compressing ethylene monomer at a pressure equal to or greater than 120 MPa; adding a fresh comonomer and, optionally, a fresh modifier in liquid form at the same pressure in order to obtain a compressed reaction mixture; introducing the compressed reaction mixture into an autoclave reactor in some specific conditions and, optionally, into at least one additional reactor; adding at least one free radical initiator in order to start a polymerization reaction; and separating the ethylene; wherein all the compressed reaction mixture introduced in the autoclave reactor is introduced into the first reaction zone.

In an embodiment, the process of the present disclosure is for producing an ethylene copolymer and step c) above is as follow:

c'. adding into the compressed ethylene/comonomer mixture a fresh modifier in liquid form at a pressure equal to or greater than 120 MPa, such as from 120 MPa to 360 MPa in order to obtain a compressed reaction mixture.

Namely, instead of a compressed ethylene/comonomer mixture, a herein called compressed reaction mixture (containing fresh comonomer and fresh modifier) is used.

In another embodiment, the fresh comonomer or the fresh comonomer and fresh modifier are added in liquid form at a pressure equal to or greater than 120 MPa, such as from 120 MPa to 360 MPa, into one or more points located between the secondary compressor(s) discharge and the reactor system. Particularly, the fresh comonomer is kept in liquid form by controlling the temperature to prevent both crystallization and thermal polymerization.

FIG. 1 schematically depicts a polymerization plant 1, including an ethylene feed line 2, which supplies fresh ethylene to a primary compressor 3. The ethylene discharged from the primary compressor 3 flows via conduit 4 having a valve to the secondary compressor 5. A medium pressure recycle system 13 supplies unreacted (recycled) ethylene to secondary compressor 5. The primary compressor 3 pressurizes fresh ethylene to the pressure of the ethylene stream exiting recycle system 13 for feeding to the secondary compressor 5. The primary compressor 3 may be a single compressor or may be two or more compressors in series or parallel that pressurize the fresh ethylene to the pressure of the ethylene recycle stream (not shown). The ethylene recycle stream may contain some unreacted comonomer and/or unreacted modifier. In some ethylene manufacturing plants, the ethylene discharged from the primary compressor 3 is divided into two streams: (a) one stream being combined with recycled ethylene and fed to the suction of the secondary compressor 5; and (b) the other stream 15 injected into the ethylene/polymer mixture downstream of the high-pressure reactor pressure control valve 7. This embodiment provides a rapid cooling of the ethylene/polymer mixture before entering into the product separation unit. An alternative is the use of a product cooler (not shown) and gets similar result.

Figure 4:
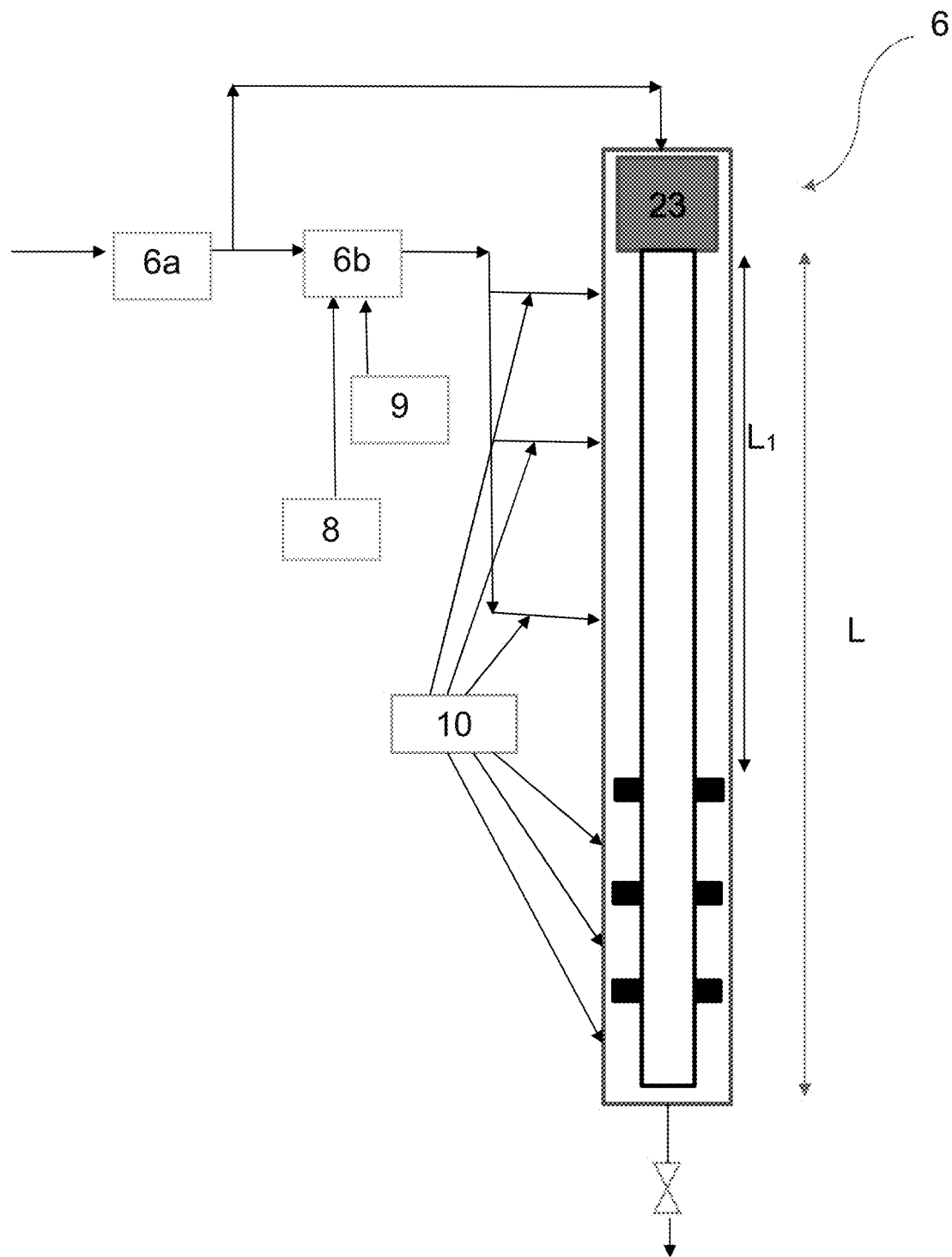
FIG. 4 shows schematically an autoclave reactor arrangement, wherein the reactor volume (V) is $V=L*\pi*(ID/2)^2$; $V_1/V_T>0.5$, particularly 0.55-0.7; L is the total autoclave reactor length, ID is the inside diameter of the autoclave reactor; $V_1$ is the volume occupied by first reaction zone, and $V_T$ is the total autoclave reactor volume.

Secondary compressor 5 compresses the ethylene to a pressure of at least 120 MPa for supply to the reactor arrangement 6 (see also FIG. 4 for a detail of 6). The secondary compressor 5 is typically a unit driven by a single motor but may, alternatively, comprise two or more compressors in series or parallel driven by separate motors (not shown). The scope of the present disclosure includes any configuration of compressors, including the configuration simplified in FIG. 1, that compresses the ethylene from the pressure of the ethylene as it leaves the primary compressor 3 to the desired reactor pressure in the range of 120 MPa to 360 MPa.

The injection of liquids to a pressure equal to or greater than 120 MPa, and up to 360 MPa and higher is known by those skilled in the technology. Double-acting oscillating piston pumps, typically used for initiator, comonomer, and other liquid additions, are available in the market. The use of vertical plunger pumps of similar high-pressure capability and higher volume capacity are also commercially available.

As stated above, the modifier, the comonomer, or both are injected from stations 8 (comonomer) and 9 (modifier) in liquid form at a pressure from 120 MPa to 360 MPa at specific locations between the secondary compressor 5 discharge and the reactor arrangement 6. Particularly, injection of the comonomer and/or the modifier occurs after a side secondary compressor stream is taken (free of fresh comonomer and fresh modifier) as can be seen in the detail of FIG. 4. This significantly reduces fouling caused by thermal polymerization (such as at inter-stage coolers of the secondary compressor, second stage discharge piping as well as reactor feed gas coolers or heaters), as well as risk for reaction decomposition. This results in improved lubrication of the packing/plunger system and, as a consequence, in longer packing life at the first and second compression stage cylinders, reduced risk of process safety incident due to plunger breaking failure at any of the cylinders. Additionally, reliability at motor autoclave and better top bearing are also improved. When both a comonomer and a modifier are injected, the modifier can be injected at the mentioned location before, after or simultaneously to the injection of the comonomer.

In the process of polymerizing ethylene in the reactor 6, once established the desired throughput of ethylene through the secondary compressor 5 and into the reactor 6, the pressure in the reactor can be controlled by the high-pressure control valve 7, through which the product mixture exits the reactor 6. Immediately downstream of the high-pressure control valve 7 there can be a jet pump or "cold gas inlet" device 11, where a cold ethylene stream from the Primary compressor cools the reaction mixture to the desired temperature. After the high-pressure reactor control valve, the reaction mixture is in a phase-separated state.

Product separation may be carried out in one stage separation; however, two or three-stage separation is of general practice. For illustration, FIG. 1 includes a two-stage separation system. Upon being cooled, the reaction mixture enters a medium-pressure separator 12, where the first separation of the polymer from unreacted ethylene is carried out. Overhead gas from medium-pressure separator 12 flows into medium-pressure recycle system 13, where the unreacted ethylene is cooled and returned to suction of the secondary compressor 5.

The polymer flows from the bottom of medium-pressure separator 12 into low-pressure separator 14, separating almost all of the remaining ethylene from the polymer. The remaining ethylene is transferred either to a flare (not shown) or a purification unit (not shown) or is recycle to primary compressor 3. Molten polymer flows from the bottom of low-pressure separator 14 to an extruder (not shown) for extrusion, cooling and pelletizing.

Particularly, the inventors have found that, in a process for the manufacture of an ethylene copolymer, by adding directly a fresh comonomer in liquid form at a pressure from 120 MPa to 360 MPa into one or more points of the ethylene monomer stream located between the secondary compressor discharge and the reactor system, particularly and at a relatively low temperature to prevent thermal polymerization and following with an immediate quenching with ethylene from the secondary compressor, both thermal polymerization inside the secondary compressor and fouling are highly reduced. Nevertheless, an advantageous effect has also been observed in the process for the manufacture of ethylene homopolymer by adding the compressed ethylene monomer (form at a pressure from 120 MPa to 360 MPa) at a relatively low temperature such as from −20° C. to 70° C., as can be seen from the Comparative Examples 5 and 6, wherein by lowering the $T_{inlet}$ higher conversion and production are obtained.

The mentioned effect is especially significant when adding high reactive comonomers such acrylates or acid monomers or when adding a high concentration of vinyl acetate monomer to produce high VA content EVA products (e.g., up to 40 wt. % VA in the feed mixture). The system works better when injection of the liquid comonomer (and optionally liquid modifier) is into one or more points of the above-mentioned location.

Thus, in an embodiment, optionally in combination with one or more features of the particular embodiments defined above, the compressed ethylene/comonomer or the compressed reaction mixture is introduced into the autoclave reactor and, optionally, into the at least one additional reactor at a temperature from −15° C. to 40° C., or from −10° C. to 10° C.

Polymerization occurs by adding one or more free radical initiators 10.

In an embodiment, optionally in combination with one or more features of the particular embodiments defined above, the free radical initiator is an organic peroxide. Examples of organic peroxides include, without being limited to as bis (2-ethylhexyl) peroxydicarbonate, tert-butyl per(2-ethyl) hexanoate, tert-butyl perpivalate, tert-butyl perneodecanoate, tert-butyl perisobutyrate, tert-butyl per-3,5,5,-trimethylhexanoate, tert-butyl perbenzoate, di-tert-butyl peroxide. These organic peroxide initiators are used in conventional amounts, typically from 0.005 to 0.2 wt % based on the weight of polymerizable monomers. The free radical initiator can be injected directly in the reactor in form of a solution in a hydrocarbon solvent such as an isododecane at each reaction zone in order to control the reaction temperature efficiently.

In another embodiment, optionally in combination with one or more features of the particular embodiments defined above, the comonomer may be at least one, but not limited, of vinyl acetate (VA), propylene, 1-butene, iso-butene, 1-hexene, 1-octene, methacrylic acid, methyl acrylate, acrylic acid, ethyl acrylate, n-butyl acrylate (nBA), and a mixture thereof. In one embodiment, optionally in combination with one or more features of the particular embodiments defined above, the comonomer content, in polymerized form, in the ethylene-based polymer is from 0 wt % to 45 wt %, or from 1.0 to 40.0 wt %, or from 2.0 to 35.0 wt %, or from 3.0 to 30.0 wt %, or from 3.0 to 25.0 wt %, or from 3.0 to 20.0 wt %, or from 3.0 to 15.0 wt %, or from 3.0 to 10.0 wt %, based on the weight of the ethylene-based polymer.

The modifier involves the termination of growing polymer chains, thus limiting the ultimate molecular weight of the polymer material. By controlling the concentration of the selected modifier, the length of polymer chains, and hence the molecular weight can be controlled.

The melt flow index (MFI) of a polymer, which is related to $M_n$, is controlled in the same way. Examples of modifiers include, without being limited to propylene, 1-butene, iso-butene, 1-hexene, 1-octene, n-butane, isobutane, methyl ethyl ketone, propionaldehyde, isopropyl alcohol, methanol, ethanol, tetramethylsilane, vinyl ethyl ether, isobutene, and acetic anhydride. Usually, the modifier can be in an amount from 0.05% to 10% wt based on the weight of polymerizable monomers.

Some modifiers such as propylene, 1-butene, iso-butene, 1-hexene, and 1-octene can also participate in a co-polymerization reaction.

Critical engineering design considerations must be taken into account when utilizing the reactor configuration of the present disclosure for the injection of high reactive comonomers.

The reactor system arrangement includes an autoclave reactor with an internal agitator electrical motor. A portion of the secondary compressor flow (i.e. of the compressed ethylene stream) diverts to cool the electrical motor.

Thus, in an embodiment of the process of the present disclosure, optionally in combination with one or more features of the particular embodiments defined above, a portion of the compressed ethylene monomer stream is diverted to cool down the internal agitator electrical motor of the autoclave reactor and the fresh comonomer and, if added, the fresh modifier are added to the non-diverted portion of the compressed ethylene monomer.

The inventors have discovered that by adding directly fresh comonomers and, optionally, fresh modifiers in liquid form at a pressure equal to or greater than 120 MPa after such diversion, the operating time of such motor and of the reactor top bearing is increased. This diversion is of particular importance when operating with comonomers that exhibit higher reactivity than ethylene. As an instance, when producing ethylene-acrylate copolymers or ethylene-acid monomer copolymers, which almost convert completely in the reactor, the diversion of part of the ethylene stream before adding the comonomer towards the electrical motor has a very positive impact on the motor and top bearing lifetime. In this situation, motor and top bearing will "see" virtually no comonomer concentration than the alternative of adding the fresh comonomer to the suction of the secondary compressor.

Thus, in another embodiment, optionally in combination with one or more features of the particular embodiments defined above, the process of the present disclosure comprises:

a. compressing ethylene monomer in one or more compressors to a pressure equal to or greater than 120 MPa, such as from 120 MPa to 360 MPa, in order to obtain a compressed ethylene monomer;

b. introducing the compressed ethylene monomer into an autoclave reactor and, optionally, into at least one additional reactor, wherein the autoclave reactor comprises an internal agitator electrical motor and has a first reaction zone and at least one more reaction zone, and the first reaction zone has a volume that is greater than 50%, particularly from 55% to 70%, of the total reactor volume, wherein:

i) a first portion of the compressed ethylene monomer is diverted to cool down the internal agitator electrical motor;

ii) a fresh comonomer in liquid form at a pressure equal to or greater than 120 MPa, such as from 120 MPa to 360 MPa, is added to a second portion of the compressed ethylene monomer in order to obtain a compressed ethylene/comonomer mixture;

iii) optionally, a fresh modifier in liquid form at a pressure equal to or greater than 120 MPa, such as from 120 MPa to 360 MPa, is added to the compressed ethylene/comonomer mixture in order to obtain a compressed reaction mixture;

iv) the compressed ethylene/comonomer mixture or the compressed reaction mixture is introduced into the autoclave reactor and, optionally, into at least one additional reactor, wherein all the compressed ethylene/comonomer mixture or all the compressed reaction mixture that is introduced in the autoclave reactor is introduced into the first reaction zone and downstream of the internal agitator electrical motor, i.e., such that the compressed ethylene/comonomer mixture or the compressed reaction mixture do not enter in contact with the motor and thus the motor is cooled down without the detrimental effect of the fresh comonomer and/or fresh modifier;

c. adding into the autoclave reactor and, optionally, into the at least one additional reactor at least one free radical initiator in order to start a polymerization reaction; and d. separating the ethylene polymer;

wherein the compressed ethylene/comonomer or the compressed reaction mixture is introduced into the autoclave reactor and, optionally, into the at least one additional reactor at a temperature from −20° C. to 70° C., or from −15° C. to 40° C., or from −10° C. to 10° C.

Thus, 100% of the ethylene monomer, the compressed ethylene/comonomer mixture, or the compressed reaction mixture that is introduced into the autoclave reactor, is introduced in the first reaction zone.

In another embodiment, step iii) is as follow:

iii) a fresh modifier in liquid form at a pressure equal to or greater than 120 MPa, such as from 120 MPa to 360 MPa, is added to the compressed ethylene/comonomer mixture in order to obtain a compressed reaction mixture.

Figure 2:
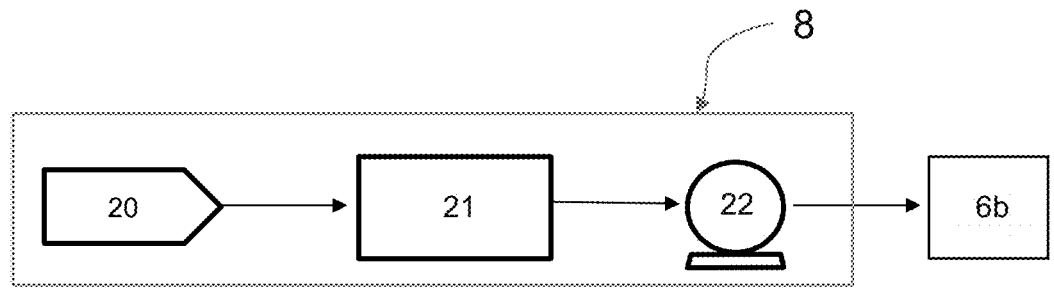
FIG. 2 shows schematically critical design considerations when injecting comonomers in liquid form at a pressure equal to or greater than 120 MPa.
Figure 3:
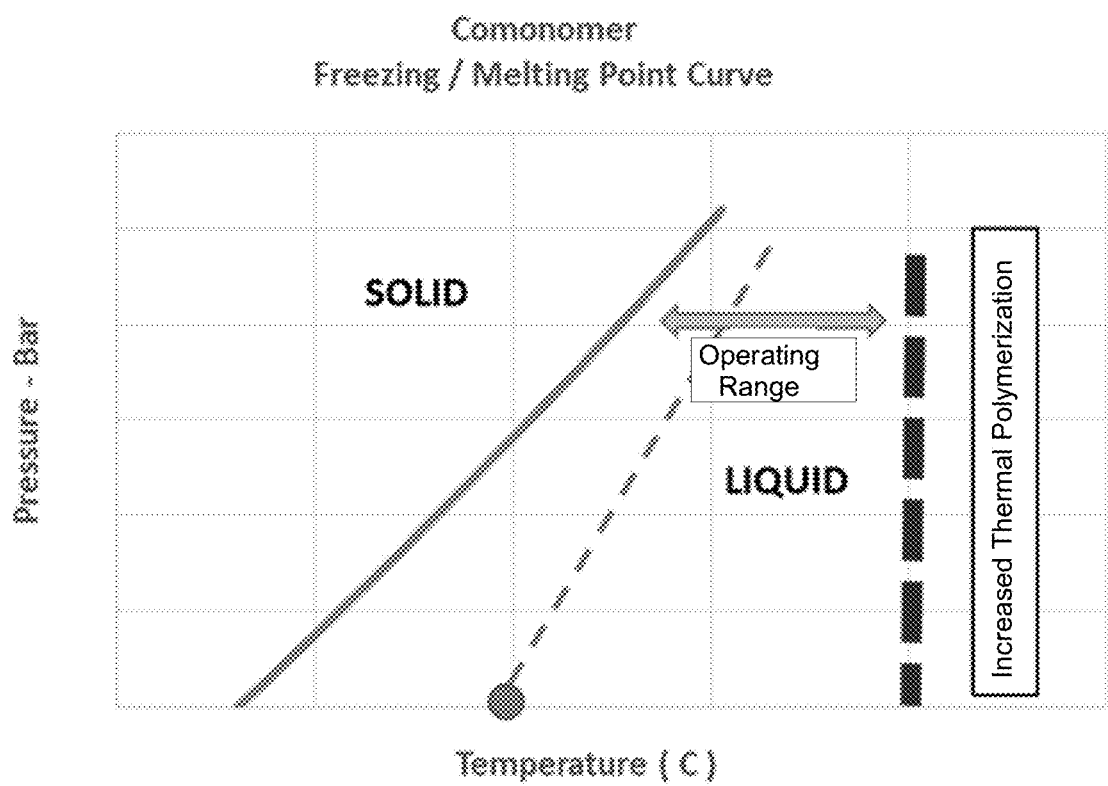
FIG. 3 shows schematically of a typical pressure-temperature freezing/melting point curve of a high reactive comonomer and typical high-pressure liquid compression limits.

FIG. 2 schematically depicts an embodiment of the station of 8 of FIG. 1 to add comonomers in liquid form at pressures equal to or greater than 120 MPa. The configuration arrangement depicted in FIG. 2 is of particular importance with very high reactive comonomers, like acrylates, methyl acrylic acid, and acrylic acid, although it can be used as well with other comonomers. The arrangement consists of a feed line from comonomer storage 20, a heat exchanger 21, a high-pressure pump 22 followed by immediate quenching with ethylene 6b. The heat exchanger 21 contains design elements capable of providing the required temperature at the required pressure to prevent from thermal polymerization of the liquid comonomer during the heating process. This pressure and temperature conditions are given by the freezing/melting point curve of the comonomer used, and the impact of the high-pressure compression on the fluid temperature. Each comonomer exhibits a specific solid-liquid pressure-temperature relation as described graphically in FIG. 3. It is known that high temperature favours thermal polymerization, while increased pressure increases the probability of the liquid to solid phase change. The design must take into account the pressure-temperature operating window in which the comonomer stays in liquid form, and the temperature limit above which thermal polymerization occurs. While the liquid comonomer is pumped by a high-pressure pump 22 from typical storage conditions 20 (e.g., 5 bars) to a pressure equal to or greater than 120 MPa, the liquid comonomer experience a near-adiabatic compression, undergoing a temperature increase, as part of the compression energy is transmitted from the pump to the liquid. This behaviour is specific for each comonomer type and is usually well understood by the operator. As pressure increases, the operating range between freezing and polymerization gets narrower.

In order to carrying out a rapid cooling (quenching) of the compressed comonomer, it is injected in the compressed ethylene stream coming from the secondary compressor in order to dilute it, and the obtained compressed ethylene/comonomer mixture, optionally also containing a modifier, is cooled down in a quenching device 6b. A compressed modifier, also at pressure equal to or greater than 120 MPa such as from 120 MPa to 360 MPa, can be injected in the ethylene stream before, during, or after injection of the compressed comonomer. Particularly, the compressed ethylene/comonomer or the compressed ethylene/comonomer/modifier mixture is cooled down to a temperature from −20° C. to 70° C., or from −15° C. to 40° C., or from −10° C. to 10° C.

In another embodiment, optionally in combination with one or more features of the particular embodiments defined above, the comonomer is compressed in a high-pressure pump having an outlet from which the compressed comonomer is discharged, and then injected in an ethylene stream (particularly, of the non-diverted portion of the compressed ethylene monomer), optionally containing a modifier, wherein the distance from the outlet of the compressed comonomer from the high-pressure pump to the inlet of the ethylene stream in the quenching device 6b is equal to or below to 300 m, or to 200 m, or to 100 m. The quenching device 6b is designed such that the outlet temperature of the comonomer/ethylene mixture is from −20° C. to 70° C., or from −15° C. to 40° C., or from −10° C. to 10° C.

As stated above, the reactor system utilizes a multi-reaction zone autoclave configuration, i.e. an autoclave reactor having a first reaction zone and at least one more reaction zone. As an example, FIG. 4 schematically depicts a multi-reaction zone autoclave reactor, particularly, an autoclave reactor having four reaction zones. With this configuration, fresh comonomer and fresh modifier are added between cooling section 6a and quenching device 6b, after part of the secondary compressor stream is diverted to cool the autoclave motor (23) as disclosed earlier. In cooling section 6a, the ethylene stream coming from the secondary compressor can be cooled down to a temperature from 30° C. to 60° C.

In an embodiment of the process of the present disclosure, optionally in combination with one or more features of the particular embodiments defined above, previously to obtain a compressed ethylene/comonomer mixture, optionally containing a modifier, the compressed ethylene monomer stream of step a) is cooled down to a temperature from 30° C. to 60° C.

In the arrangement disclosed above, the autoclave reactor configuration exhibit the characteristic of a large volume in reaction zone 1 compared to the total reactor volume. Thus, as mentioned above, the autoclave reactor of the present disclosure has two or more reaction zones and a total reactor volume, and the first reaction zone has a volume that is greater than 50%, particularly from 55% to 70%, of the total reactor volume.

Under this configuration, all the compressed reaction mixture (comprising ethylene, a comonomer and, optionally, a modifier) that is introduced into the autoclave reactor is introduced in the first reaction zone. No additional comonomer or modifier is fed to other reaction zones of the autoclave configuration.

When more than one reactors are used, the additional reactor can be either another autoclave reactor or a tubular reactor, either in parallel or series configuration.

Thus, in another embodiment of the process of the present disclosure, optionally in combination with one or more features of the particular embodiments defined above, the reactor system utilizes an autoclave reactor configuration as described earlier, where a portion of the compressed ethylene monomer, the compressed ethylene/comonomer mixture, or the compressed reaction mixture feeds the first reaction zone of a first autoclave reactor while the remaining portion feeds either a second autoclave reactor or a tubular reactor configured in series or in parallel, particularly in series, to the first autoclave reactor. In a particular embodiment, the amount of compressed ethylene monomer, compressed ethylene/comonomer mixture, or compressed reaction mixture added to the first autoclave reactor is equal to or higher than 80 wt. %, particularly from 80 wt. % to 95 wt. %, of from 85 wt % to 95 wt. %.

In another embodiment of the process of the present disclosure, optionally in combination with one or more features of the particular embodiments defined above, the polymerization reaction is carried out at a temperature from 110° C. to 340° C. and a pressure from 120 MPa to 360 MPa.

The process of the present disclosure provides a broad range of ethylene polymers and copolymers having narrow molecular weight distributions. These properties make the process of the present disclosure particularly suitable for the preparation of ethylene polymers or ethylene-base polymers as a raw material in the production of different articles of manufacture for multiple applications. Articles can be manufactured by processing the product obtainable by the process of the present disclosure. The articles can be formed by conventional methods known in the art, such as by extrusion.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred embodiments described herein.

EXAMPLES

The molecular weights (expressed as Mn and Mw) and polydispersity index were measured using gel permeation chromatography (GPC) with refractive index detector, as provided by Waters (model 717 plus Autosampler with a Water 2487 refractive index detecto) following ASTM D6474.

The percentage of co-monomers in the polymer was calculated from a calibrated Fourier-Transformer Infrared (FTIR) spectroscopy, as provided by Fisher (Nicolet). ASTM D-5594 and ASTM D3594 where used for the determination of EVA and acrylate content in the corresponding ethylene copolymer, respectively. Alternative is the use of 1H Nuclear Magnetic Resonance (NMR) obtained in a Brucker 500 MHz equipment.

Comparative Example 1—Effect on the Secondary Compressor

This example shows the effect of adding directly fresh highly reactive comonomers, like acrylates or acid comonomers, in liquid form at a pressure from 120 MPa to 360 MPa to secondary compressor packing cylinders lifetime for the production of ethylene copolymer. It known in the industry the negative effect of adding high reactive comonomers to the suction of the secondary compressors to compressor's mechanical reliability, like premature packings, valves and plunger failures. Table 1, "homopolymer" column, shows the typical packing life in secondary compressors in high-pressure polyethylene plants when producing low-density polyethylene as the mainstream product family, following best recommended practices by Original Equipment Manufacturers (OEM). For comparison purposes, it also includes (see "copolymer" column) typical packing life in secondary compressors of plants producing ethylene-acrylates or ethylene-acid monomers copolymers when the comonomer is added to the suction of the secondary compressor. These values are of industry experience and known by those skilled in the art.

TABLE 1

| | Secondary Compressor | |
| --- | --- | --- |
| | Homopolymer | Copolymers |
| First stage packing life (hrs) | ~20,000-25,000 | 8,000-10,000 |
| Second stage packing (hrs) | ~15,000-20,000 | 5,000-8,000 |

The addition of acrylates and acid comonomers under the conditions described in the present disclosure, allows the secondary compressor to operate under similar characteristics to homopolymer case, providing improvements to packing life comparable to those experienced during homopolymer conditions. Similar improvements are expected to other critical compressor components like valves and cylinder plungers.

When producing high-pressure copolymers with lower reactivity, like vinyl acetate during the production of ethylene-vinyl acetate copolymers, the impact is proportional to the reduction of comonomer concentration in the suction of the secondary compressor. Other recommended original equipment manufacturer (OEM) practices and best operating practices, like low suction temperature conditions, proper lube oil viscosity and flows, and so on, which are known by a person skilled in the art, must be taken into account.

Example 1 and Comparative Examples 2 and 3—Effect on the Motor and Top Bearing

Table 2 below shows the effect in the autoclave motor lifetime and top bearing lifetime in hours by adding directly fresh high reactive comonomers, like acrylates or acid comonomers (Example 1), in liquid form at a pressure from 120 MPa to 360 MPa, under the operating conditions depicted in FIG. 4 (i.e., no comonomer through the autoclave reactor motor). Comparison was made with regard to a standard process for the preparation of homopolymer (Comparative Example 2) and to a standard process for the preparation of copolymer, i.e., with ethylene/comonomer mixture obtained by adding fresh comonomer to the suction of the secondary compressor and using part of this stream to cool autoclave reactor motor (Comparative Example 3).

TABLE 2

| | Autoclave | | |
|---|---|---|---|
| | Comp. Ex. 2 Homopolymer | Comp. Ex. 3 Copolymers | Example 1 Copolymers |
| Motor lifetime (hrs) | ~20,000-25,000 | ~8,000 | ~20,000-25,000 |
| Top Bearings lifetime (hrs) | ~15,000-20,000 | <8,000 | ~15,000-20,000 |

Adding acrylates and acid comonomers under the conditions described in the present disclosure (Example 1) provide improvements to the motor and top bearings lifetime in line with those experienced with a standard process for the preparation of homopolymer (no comonomer through the autoclave reactor motor)

When producing high-pressure ethylene copolymers with comonomers having lower reactivity, like vinyl acetate for the production of ethylene-vinyl acetate copolymers, the impact is lower and proportional to the reduction of comonomer concentration in the stream cooling the motor.

Comparative Example 4

FIG. 4 shows the schematic of the autoclave reaction configuration part of this invention when operating in the pressure range from 120 MPa to 360 MPa. In Table 3 (Comparative Example 4) the results for a multi-zone (four-zone) autoclave reactor configuration with fresh ethylene introduced to each reaction zone, inlet feed temperature, and reaction zone temperatures are shown. A two-melt flow index, ethylene-vinyl acetate copolymer with 18 wt % VA content, was produced according to the parameters indicated in Table 3. In this Comparative Example 4, a standard four zones reactor autoclave is used, where fresh comonomer is introduced to the suction of secondary compressor, and the ethylene/vinyl acetate mixture is split into four streams, adding one per reaction zone. Reactor pressure is 160 MPa, inlet temperature to each reaction zone is 30 C and reaction zone temperatures are controlled at the indicated value. Under these conditions, production is 7.2 Tons/hr and Mw/Mn of 7.5 for a 2 gr/10 min Melt Flow Index resin and the Average Polymerization temperature is 184° C.

TABLE 3

| | | Comparative Example 4 EVA REFERENCE | | |
|---|---|---|---|---|
| MFI | gr/10 min | 2.0 | | |
| Density | gr/cm3 | 0.940 | | |
| Product | % wt VA | 18% wt VA | | |
| Mw/Mn | | 7.5 | | |
| Hyper Flow | Tons/hr | 46.2 | | |
| Pressure | Mpa | 160 | | |
| | | % Flow | $T_{inlet}$ (° C.) | T (° C.) |
| Reaction Zone | 1 | 20% | 30 | 150 |
| | 2 | 33% | 30 | 150 |
| | 3 | 26% | 30 | 190 |
| | 4 | 21% | 30 | 215 |
| Avg inlet T | ° C. | | 30 | |
| Avg Polym T | ° C. | 184 | | |
| Conversion | % | 15.6% | | |
| Production | Tons/hr | 7.2 | | |

Examples 2a and 2b

Table 4 shows the results for two examples wherein ethylene-vinyl acetate copolymer was prepared following the process of the present disclosure according to the parameters indicated in Table 4.

TABLE 4

| | | Example 2a EVA IMPROVE 1 | Example 2b EVA IMPROVE 2 |
|---|---|---|---|
| MFI | gr/10 min | 2.0 | 2.0 |
| Density | gr/cm³ | 0.942 | 0.941 |
| Product | wt % VA | 18 wt % VA | 18 wt % VA |
| Mw/Mn | | 5.8 | 6.5 |
| Hyper Flow | Tons/hr | 46.2 | 46.2 |
| Pressure | Mpa | 160 | 160 |

TABLE 4-continued

|  |  | % | $T_{inlet}$ (° C.) | T (° C.) | % | $T_{inlet}$ (° C.) | T (° C.) |
|---|---|---|---|---|---|---|---|
| Reaction Zone | 1 | 100 | 30 | 150 | 100 | 9 | 150 |
|  | 2 | 0 | — | 150 | 0 | — | 150 |
|  | 3 | 0 | — | 190 | 0 | — | 190 |
|  | 4 | 0 | — | 215 | 0 | — | 235 |
| Avg inlet T | C. |  | 30 |  |  | 9 |  |
| Avg Polym T | C. |  | 167 |  |  | 174 |  |
| Conversion | % |  | 15.6% |  |  | 19.1% |  |
| Production | Tons/hr |  | 7.2 |  |  | 8.8 |  |

In Example 2a (EVA IMPROVE 1), the fresh comonomer was injected according to the process of the present disclosure to an autoclave reactor configuration FIG. 4. All ethylene and comonomer were introduced in reaction zone 1, operating with the same pressure and temperature as the Comparative Example 4. Results show a narrower molecular weight distribution of 5.8 than in Comparative Example 4 (Mw/Mn of 7.2). In Example 2b (EVA IMPROVE 2), a higher conversion rate option is possible, increasing the bottom reactor temperature. With this set of conditions, the process of the present disclosure shows a higher conversion rate (19.1% vs 15.6%) and narrower molecular weight distribution (Mw/Mn of 6.5 vs 7.2) than the Comparative Example 4.

Comparative Example 5 and Example 3

A process was carried out with ethylene butyl acrylate copolymers following the process of the present disclosure. In Table 5 the conditions used in the process carried out are shown, as well as the parameters of the obtained copolymers. As shown in Table 5 similar results to previous examples were obtained. The ethylene butyl acrylate copolymer (EBA) obtained in Example 3 (EBA IMPROVE 1) showed a narrower molecular weight distribution and a higher conversion rate than EBA of Comparative Example 5 (EBA REFERENCE) carried out following a known process.

TABLE 5

|  |  | Comparative Example 5 EBA REFERENCE | Example 3 EBA IMPROVE 1 |
|---|---|---|---|
| MFI | gr/10 min | 7.5 | 7.5 |
| Density | gr/cm³ | 0.923 | 0.923 |
| Product | wt % nBA | 17 wt % nBA | 17 wt % nBA |
| Mw/Mn |  | 7.0 | 6.7 |
| Hyper Flow | Tons/hr | 46.0 | 46.0 |
| Pressure | Mpa | 185 | 185 |

|  |  | % | $T_{inlet}$ (° C.) | T (° C.) | % | $T_{inlet}$ (° C.) | T (° C.) |
|---|---|---|---|---|---|---|---|
| Reaction Zone | 1 | 20 | 55 | 190 | 100 | 12 | 190 |
|  | 2 | 33 | 45 | 190 | 0 | — | 190 |
|  | 3 | 26 | 45 | 195 | 0 | — | 195 |
|  | 4 | 21 | 40 | 210 | 0 | — | 210 |
| Avg inlet temp | C. |  | 46 |  |  | 12 |  |
| Avg Polym Temp | C. |  | 197 |  |  | 192 |  |
| Conversion | % |  | 14.1 |  |  | 17.0 |  |
| Production | Tons/hr |  | 6.5 |  |  | 7.8 |  |

Comparative Example 6

An ethylene homopolymer was produced according to the parameters indicated in Table 6. In Table 6 the results for a multi-zone (four-zone) autoclave reactor configuration with fresh ethylene introduced to each reaction zone, inlet feed temperature, and reaction zone temperatures are also shown.

TABLE 6

|  |  | Comparative Example 6 LDPE REFERENCE |
|---|---|---|
| MFI | gr/10 min | 2.0 |
| Density | gr/cm3 | 0.921 |
| Product |  | LDPE |
| Mw/Mn |  | 7.8 |
| Hyper Flow | Tons/hr | 46.2 |
| Pressure | Mpa | 195 |

|  |  | % | $T_{inlet}$ (° C.) | T (° C.) |
|---|---|---|---|---|
| Reaction Zone | 1 | 20 | 60 | 215 |
|  | 2 | 33 | 45 | 215 |
|  | 3 | 26 | 45 | 215 |
|  | 4 | 21 | 40 | 240 |
| Avg inlet temp | C. |  | 47 |  |
| Avg Polym Temp | C. |  | 223 |  |
| Conversion | % |  | 15.2 |  |
| Production | Tons/hr |  | 7.0 |  |

Comparative Examples 7a and 7b

Table 7 shows the results for Comparative Examples 7a and 7b wherein a polyethylene homopolymer, particularly a low-density polyethylene (LDPE), was prepared according to the process of the present disclosure.

TABLE 7

|  |  | Comparative Example 7a LDPE IMPROVE 1 | | | Comparative Example 7b LDPE IMPROVE 2 | | |
| --- | --- | --- | --- | --- | --- | --- | --- |
| MFI | gr/10 min | 2.0 | | | 2.0 | | |
| Density | gr/cm3 | 0.922 | | | 0.925 | | |
| Product |  | LDPE | | | LDPE | | |
| Mw/Mn |  | 7.2 | | | 7.2 | | |
| Hyper Flow | Tons/hr | 46.2 | | | 46.2 | | |
| Pressure | Mpa | 195 | | | 220 | | |
|  |  | % | $T_{inlet}$ (° C.) | T (° C.) | % | $T_{inlet}$ (° C.) | T (° C.) |
| Reaction Zone | 1 | 100 | 47 | 215 | 100 | 10 | 205 |
|  | 2 | 0 |  | 45 | 215 | 0 |  | 215 |
|  | 3 | 0 |  | 45 | 215 | 0 |  | 215 |
|  | 4 | 0 |  | 40 | 240 | 0 |  | 245 |
| Avg inlet T | ° C. | 47 | | | 10 | | |
| Avg Polym T | ° C. | 218 | | | 211 | | |
| Conversion | % | 15.2 | | | 18.5 | | |
| Production | Tons/hr | 7.0 | | | 8.5 | | |

CITATION LIST

1. ASTM D6474
2. ASTM D-5594
3. ASTM D3594

For reasons of completeness, various aspects of the invention are set out in the following numbered clauses:

1. A process for producing an ethylene polymer comprising:
   a. compressing ethylene monomer in one or more compressors to a pressure equal to or greater than 120 MPa in order to obtain a compressed ethylene monomer;
   b. optionally, adding to the compressed ethylene monomer a fresh comonomer in liquid form at a pressure equal to or greater than 120 MPa in order to obtain a compressed ethylene/comonomer mixture;
   c. optionally, adding into the compressed ethylene monomer or into the compressed ethylene/comonomer mixture a fresh modifier in liquid form at a pressure equal to or greater than 120 MPa in order to obtain a compressed reaction mixture;
   d. introducing the compressed ethylene monomer, the compressed ethylene/comonomer mixture, or the compressed reaction mixture into an autoclave reactor and, optionally, at least one additional reactor;
   e. adding into the autoclave reactor and, optionally, into the at least one additional reactor at least one free radical initiator in order to start a polymerization reaction; and
   f. separating the ethylene polymer;
   wherein the autoclave reactor has a first reaction zone and at least one more reaction zone, and all the compressed ethylene monomer, all the compressed ethylene/comonomer mixture, or all the compressed reaction mixture that is introduced in the autoclave reactor is introduced into the first reaction zone.
2. The process according to clause 1, wherein the ethylene polymer is an ethylene copolymer, the process comprising:
   b'. adding to the compressed ethylene monomer a fresh comonomer in liquid form at a pressure equal to or greater than 120 MPa in order to obtain a compressed ethylene/comonomer mixture;
   c'. optionally, adding into the compressed ethylene/comonomer mixture a fresh modifier in liquid form at a pressure equal to or greater than 120 MPa in order to obtain a compressed reaction mixture;
   d'. introducing the compressed ethylene/comonomer mixture or the compressed reaction mixture into an autoclave reactor and, optionally, at least one additional reactor.
3. The process according to clauses 1 or 2, wherein the ethylene monomer is discharged from a secondary compressor and is free of fresh comonomer and fresh modifier, and the fresh comonomer and/or the fresh modifier are added into one or more points located between the secondary compressor discharge and the autoclave reactor.
4. The process according to any one of clauses 1 to 3, wherein the compressed ethylene monomer, the compressed ethylene/comonomer or the compressed reaction mixture is introduced into the autoclave reactor and, optionally, into the at least one additional reactor at a temperature from −20° C. to 70° C.
5. The process according to clause 4, wherein the temperature is from −10° C. to 10° C.
6. The process according to any one of clauses 1 to 5, wherein the autoclave reactor has two or more reaction zones and a total reactor volume, and the first reaction zone has a volume that is greater than 50% of the total reactor volume.
7. The process according to any one of clauses 1 to 6, wherein the polymerization initiator is an organic peroxide.
8. The process according to any one of clauses 1 to 7, wherein, previously to obtaining the compressed ethylene/comonomer or the compressed reaction mixture, the compressed ethylene monomer stream is cooled down to a temperature from 30° C. to 60° C.
9. The process according to any one of clauses 1 to 8, wherein the autoclave reactor comprises an internal agitator electrical motor, and a portion of the compressed ethylene monomer is diverted to cool down the internal agitator electrical motor.
10. The process according to any one of clauses 1 to 9, wherein the compressed comonomer is subjected to quenching by diluting it with ethylene and to a further reduction of its temperature in a quenching device.

11. The process according to any one of clauses 1 to 10, wherein the comonomer is compressed in a high-pressure pump having an outlet from which the compressed comonomer is discharged, and then injected in a compressed ethylene monomer stream, wherein the distance from the outlet of the high-pressure pump to the inlet of the compressed ethylene monomer stream is equal to or below to 300 m.

12. The process according to any one of clauses 1 to 11, wherein the at least one additional reactor is another autoclave reactor or a tubular reactor.

13. The process according to clause 12, wherein the at least one additional reactor is a tubular reactor arranged in series to the first autoclave reactor.

14. The process according to any one of clauses 1 to 13, wherein the compressed ethylene monomer, the compressed ethylene/comonomer mixture, or the compressed reaction mixture is introduced into the autoclave reactor and at least one additional reactor, and the amount of compressed ethylene monomer, compressed ethylene/comonomer mixture, or compressed reaction mixture which is introduced in the autoclave reactor is equal to or higher than 80 wt % of the total compressed reaction mixture.

15. The process according to any one of clauses 1 to 14, wherein the comonomer content is from 0 wt % to 45 wt % based on the weight of the ethylene copolymer.

The invention claimed is:

1. A process for producing an ethylene copolymer, comprising:
a) compressing ethylene monomer in one or more compressors to a pressure equal to or greater than 120 MPa in order to obtain a compressed ethylene monomer;
b) adding to the compressed ethylene monomer a fresh comonomer in liquid form at a pressure equal to or greater than 120 MPa in order to obtain a compressed ethylene/comonomer mixture;
c) optionally, adding into the compressed ethylene/comonomer mixture a fresh modifier in liquid form at a pressure equal to or greater than 120 MPa in order to obtain a compressed reaction mixture;
d) introducing the compressed ethylene/comonomer mixture, or the compressed reaction mixture into an autoclave reactor and, optionally, at least one additional reactor;
e) adding into the autoclave reactor and, optionally, into the at least one additional reactor at least one free radical initiator in order to start a polymerization reaction; and
f) separating an ethylene copolymer;
wherein the autoclave reactor has a first reaction zone and at least one more reaction zone, and all the compressed ethylene/comonomer mixture, or all the compressed reaction mixture that is introduced in the autoclave reactor is introduced into the first reaction zone;
wherein the autoclave reactor has a total reactor volume, and the first reaction zone has a volume that is greater than 50% of the total reactor volume; and
wherein the compressed ethylene/comonomer or the compressed reaction mixture is introduced into the autoclave reactor and, optionally, into the at least one additional reactor at a temperature from −20° C. to 70° C.

2. The process according to claim 1, comprising:
c') adding into the compressed ethylene/comonomer mixture a fresh modifier in liquid form at a pressure equal to or greater than 120 MPa in order to obtain a compressed reaction mixture.

3. The process according to claim 1, wherein the ethylene monomer is discharged from a secondary compressor and is free of fresh comonomer and fresh modifier, and the fresh comonomer and/or the fresh modifier are added into one or more points located between the secondary compressor discharge and the autoclave reactor.

4. The process according to claim 3, wherein the temperature is from −10° C. to 10° C.

5. The process according to claim 1, wherein the at least one free radical initiator is an organic peroxide.

6. The process according to claim 1, wherein, previously to obtaining the compressed ethylene/comonomer or the compressed reaction mixture, the compressed ethylene monomer is cooled down to a temperature from 30° C. to 60° C.

7. The process according to claim 1, wherein the autoclave reactor comprises an internal agitator electrical motor, and a portion of the compressed ethylene monomer is diverted to cool down the internal agitator electrical motor.

8. The process according to claim 1, wherein the fresh comonomer is subjected to quenching by diluting the fresh comonomer with ethylene and to a further reduction of the fresh comonomer's temperature in a quenching device.

9. The process according to claim 1, wherein the fresh comonomer is compressed in a high-pressure pump having an outlet from which the compressed fresh comonomer is discharged, and then injected in the compressed ethylene monomer, wherein the distance from the outlet of the high-pressure pump to an inlet of the compressed ethylene monomer stream is equal to or below to 300 m.

10. The process according to claim 1, wherein the at least one additional reactor is another autoclave reactor or a tubular reactor.

11. The process according to claim 10, wherein the at least one additional reactor is a tubular reactor arranged in series to the first autoclave reactor.

12. The process according to claim 1, wherein the compressed ethylene monomer, the compressed ethylene/comonomer mixture, or the compressed reaction mixture is introduced into the autoclave reactor and at least one additional reactor, and the amount of compressed ethylene monomer, compressed ethylene/comonomer mixture, or compressed reaction mixture which is introduced in the autoclave reactor is equal to or higher than 80 wt % of the total compressed reaction mixture.

13. The process according to claim 1, wherein the fresh comonomer content is from 0 wt % to 45 wt % based on the weight of the ethylene copolymer.

14. The process according to claim 2, wherein the ethylene monomer is discharged from a secondary compressor and is free of fresh comonomer and fresh modifier, and the fresh comonomer and/or the fresh modifier are added into one or more points located between the secondary compressor discharge and the autoclave reactor.

15. The process according to claim 14, wherein the temperature is from −10° C. to 10° C.

16. The process according to claim 15, wherein, previously to obtaining the compressed ethylene/comonomer or the compressed reaction mixture, the compressed ethylene monomer is cooled down to a temperature from 30° C. to 60° C.

17. The process according to claim 16, wherein the autoclave reactor comprises an internal agitator electrical motor, and a portion of the compressed ethylene monomer is diverted to cool down the internal agitator electrical motor.

18. The process according to claim 17, wherein the fresh comonomer is subjected to quenching by diluting the fresh comonomer with ethylene and to a further reduction of the fresh comonomer's temperature in a quenching device.

19. The process according to claim 18, wherein the fresh comonomer is compressed in a high-pressure pump having an outlet from which the compressed fresh comonomer is discharged, and then injected in the compressed ethylene monomer, wherein the distance from the outlet of the high-pressure pump to an inlet of the compressed ethylene monomer is equal to or below to 300 m.

20. The process according to claim 19, wherein the at least one additional reactor is another autoclave reactor or a tubular reactor.

* * * * *